(12) United States Patent
Khalid et al.

(10) Patent No.: US 9,875,116 B2
(45) Date of Patent: Jan. 23, 2018

(54) SHARING OF A USER INPUT INTERFACE OF AN APPLICATION SESSION OF ONE APPLICATION BETWEEN TWO OR MORE APPLICATIONS

(71) Applicant: CELLCO PARTNERSHIP, Basking Ridge, NJ (US)

(72) Inventors: Mohammad Raheel Khalid, Budd Lake, NJ (US); Paul Berman, Roselle Park, NJ (US); SM Masudur Rahman, Morganville, NJ (US); Samir S. Vaidya, Highland Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 406 days.

(21) Appl. No.: 14/091,001

(22) Filed: Nov. 26, 2013

(65) Prior Publication Data

US 2015/0149937 A1    May 28, 2015

(51) Int. Cl.
| | | |
|---|---|---|
| *G06F 9/44* | (2006.01) | |
| *G06F 3/0484* | (2013.01) | |
| *G06F 9/445* | (2006.01) | |
| *H04L 29/08* | (2006.01) | |

(52) U.S. Cl.
CPC .......... *G06F 9/4443* (2013.01); *G06F 3/0484* (2013.01); *G06F 8/61* (2013.01); *H04L 67/34* (2013.01)

(58) Field of Classification Search
CPC ..... G06F 3/0484; G06F 8/38; G06F 17/30165

USPC ......................................... 715/762, 760, 763
See application file for complete search history.

(56) References Cited

U.S. PATENT DOCUMENTS

| 7,395,513 | B2* | 7/2008 | Zimniewicz | G06F 8/61 |
| | | | | 715/825 |
| 2005/0050539 | A1* | 3/2005 | Burkhardt | G06F 8/61 |
| | | | | 717/174 |
| 2006/0184828 | A1* | 8/2006 | Wynn | G06F 9/4418 |
| | | | | 714/38.14 |
| 2011/0153658 | A1* | 6/2011 | Laird-McConnell | G06F 9/4443 |
| | | | | 707/769 |
| 2011/0258549 | A1* | 10/2011 | Chapple | G06F 3/0482 |
| | | | | 715/733 |
| 2012/0117534 | A1* | 5/2012 | Hershenson | G06F 8/38 |
| | | | | 717/105 |

(Continued)

*Primary Examiner* — Christopher J Fibbi (57) ABSTRACT

A primary application and a secondary application installed on a mobile communication device are both configured to obtain input from a user of the device through an application session of the primary application. The primary application transmits a notification to cause the secondary application to begin execution in the background. The primary application further transmits a request for user interface (UI) information to the secondary application. Based on UI information received from the secondary application, the primary application generates a graphical user interface (GUI) including an interface for receiving user input relating to the secondary application. The generated GUI is displayed on the device in the application session of the primary application, and user input relating to the secondary application is received in the application session of the primary application. The primary application then transmits to the secondary application user input identified as relating to the secondary application.

20 Claims, 7 Drawing Sheets

(56) References Cited

U.S. PATENT DOCUMENTS

| | | | |
|---|---|---|---|
| 2013/0013670 A1* | 1/2013 | Lim | G06F 9/44505 |
| | | | 709/203 |
| 2014/0225809 A1* | 8/2014 | Fletcher | G06F 3/14 |
| | | | 345/2.2 |
| 2015/0095160 A1* | 4/2015 | Ma | G06Q 30/0267 |
| | | | 705/14.64 |

* cited by examiner

```
{
"type": "native_ui",
"components":[
    "pageHeader": "header",
    "elements" : [
        {
        "type": "header",
        "content": "header text"
        },
        {
        "type": "text",
        "content": "text"
        },
        {
        "type": "edittext",
        "value": "default text",
        "inputType": "number"/"text"/"email"/"tel"/"password",
        "id": "componentID"
        },
        {
        "type": "checkbox",
        "label": "text",
        "value": true/false,
        "id": "componentID"
        },
        {
        "type": "horizontal_rule"
        },
        {
        "type": "line_break"
        },
        {
        "type": "dialog",
        "header": "header text",
        "content": "dialog text",
            "positiveButton": "button text",
            "negativeButton": "button text"/null
        },
        {
        "type": "image",
        "data": "base64 encoded image data",
        },
        {
        "type": "radio_group",
        "header": "header text",
        "items": ["item1", "item2", "item3", "item4",...],
            "value": 1,
            "id": "componentID"
        },
        {
        "type": "picker",
        "header": "header text",
        "items": ["item1", "item2", "item3", "item4",...],
            "value": 1,
            "id": "componentID"
        },
        {
        "type": "linkDialog",
        "link": "link text",
        "header": "header text",
        "content": "dialog text",
            "positiveButton": "button text",
            "negativeButton": "button text"/null
        },
        {
        "type": "navButton",
        "pageIndex" : 1
        "content": "button text"
        }
    ]
...
```

FIG. 3B

| Component Name | Component Schema | Component Definition |
|---|---|---|
| Page | {<br>"pageHeader" : "headerText",<br>"elements" : [{}, {}, {}]<br>} | Single UI Screen to be displayed.<br>pageHeader: The header text that indicates the title of the Page.<br>elements: The individual UI widgets or elements to be displayed on a page. |
| Header | {<br>"type": "header",<br>"content": "header text"<br>} | Text header that must appear in a larger or bolder font than a normal block of text.<br>Content: Text to be displayed |
| Text | {<br>"type": "text",<br>"content": "text"<br>} | Text Label that can span multiple paragraphs.<br>Content: Text to be displayed |
| EditText | {<br>"type": "edittext",<br>"value": "default text",<br>"inputType": "number"/<br>    "text"/"email"/"tel"/<br>    "password"<br>"id": "componentID"<br>} | Text box that receives user input.<br>value: Text to be displayed in text box by default.<br>inputType: A hint given to text box that will use allow a special keyboard and/or mask to be applied to input text.<br>Id: The unique id for this component within the JSON Object |
| Checkbox | {<br>"type": "checkbox",<br>"label": "text",<br>"value":" true"/"false",<br>"id": "componentID"<br>} | Checkbox with checked and unchecked state.<br>label: Text to be displayed adjacent to checkbox as a label.<br>value: Default state of checkbox. True = checked, False = unchecked.<br>Id: The unique id for this component within the JSON Object |
| Horizontal Rule | {<br>"type": "horizontal_rule"<br>} | Horizontal rule to be used as a separator for content. |
| Line Break | {<br>"type": "line_break"<br>} | Single line break. |

FIG. 3C

| Component Name | Component Schema | Component Definition |
|---|---|---|
| | *(continued from FIG. 3B)* | |
| Dialog | {<br>"type": "dialog",<br>"header": "header text",<br>"content": "dialog text",<br>"positiveButton": "button text",<br>"negativeButton": "button text"/null<br>} | Dialog pop up that will appear over ui. Dialogs will pop up immediately upon display of UI.<br><br>header: Text header that must appear in a larger or bolder font than a normal block of text in the Dialog box.<br><br>content: Text to be displayed.<br><br>positiveButton: A button that will contain button text and will dismiss dialog on click.<br>negativeButton: A button that will contain button text and will abort display of UI screen. If the value of negative button is null or empty this button shall not be displayed. |
| Image | {<br>"type": "image",<br>"data": "base64 encoded image data",<br>} | PNG image that will be base64 encoded.<br><br>data: base64 encoded string. |
| Radio Group | {<br>"type": "radio_group",<br>"header": "header text",<br>"items": ["item1", "item2", "item3", "item4",...],<br>"value": "1",<br>"id": "componentID"<br>} | Radio button group.<br><br>header: Text header that must appear in a larger or bolder font than a normal block of text. Must be adjacent to radio buttons.<br><br>items: Array of 0 to many text labels that must be converted to individual radio button options.<br><br>value: Index of item that must be selected by default. Negative value will indicate no default item.<br><br>Id: The unique id for this component within the JSON Object |
| Picker | {<br>"type": "picker",<br>"header": "header text",<br>"items": ["item1", "item2", "item3", "item4",...],<br>"value": "1",<br>"id": "componentID"<br>} | Selection picker.<br><br>header: Text header that must appear in a larger or bolder font than a normal block of text. Must be adjacent to picker widget.<br><br>items: Array of 0 to many text labels that must be converted to individual picker options.<br><br>value: Index of item that must be selected by default. Negative value will indicate no default item.<br><br>Id: The unique id for this component within the JSON Object |

FIG. 3D

| Component Name | Component Schema | Component Definition |
|---|---|---|
| | *(continued from FIG. 3C)* | |
| linkDialog | {<br>"type": "linkDialog",<br>"link" : "link text"<br>"header": "header text",<br>"content": "dialog text",<br>"positiveButton": "button text",<br>"negativeButton": "button text"/null<br>} | Text that appears as a link. When clicked a dialog box pops up.<br><br>Link: Text to be hyperlinked.<br><br>header: Text header that must appear in a larger or bolder font than a normal block of text in the Dialog box.<br><br>content: Text to be displayed.<br><br>positiveButton: A button that will contain button text and will dismiss dialog on click.<br><br>negativeButton: A button that will contain button text and will abort display of UI screen. If the value of negative button is null or empty this button shall not be displayed. |
| navButton | {<br>"type": "navButton",<br>"pageIndex" : 1<br>"content": "button text",<br>} | A button that will allow a user to navigate between pages in the uiObject.<br><br>pageIndex: The index of the page in the page array of the uiObject that should be displayed onClick. -1 shall indicate that all pages shall be skipped and the setup wizard will continue to the next step. -2 shall indicate that CarrierCloud setup has finished and the setup wizard will continue to the next step<br><br>content: Text to be displayed on the button. |

FIG. 4

SHARING OF A USER INPUT INTERFACE OF AN APPLICATION SESSION OF ONE APPLICATION BETWEEN TWO OR MORE APPLICATIONS

BACKGROUND

There is often a need to integrate or embed one application's functionality within another application when developing applications for mobile communication devices configured to communicate wirelessly across mobile communication networks. One example is the need to integrate or embed within a Setup Wizard of a mobile device functionality to enable the Setup Wizard to configure many other applications on the mobile device using a single process.

In order to integrate various applications' functionalities, application developers, device manufacturers, and service providers must closely coordinate application development to jointly develop a single setup application designed to configure the many applications. The single setup application, however, cannot readily be adapted to respond to changes or updates brought on by mobile device manufacturers and developers of the many applications. Additionally, the single setup application generally has a disjointed appearance as components relating to each of the many applications match the look and feel of their respective application rather than matching the look and feel of the setup application. The components further cannot react to the context of the setup application they are embedded in. The single setup application further cannot necessarily communicate user actions back to corresponding one(s) of the applications.

In other situations, instead of developing a single setup application, device manufacturers have simply configured devices to sequentially launch a series of disjoint applications each for configuring a different one of the many applications on the mobile communication device. Each of the applications is thus sequentially loaded onto the device, and each enable a user to configure a corresponding one of the applications one after the other. The sequentially launched setup applications typically have disjointed appearances, and fail to provide users with a unified setup experience.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3B-3D show a table including the component definitions for user interface objects used in the JSON schema of FIG. 3A.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to the sharing of a graphical user interface of an application session of one application between two or more applications.

Two or more applications installed on a mobile communication device may be configured to obtain input for each of the two or more applications through a single application session of one of the applications. As part of the execution of the one application, the application provides a graphical user interface (GUI) through which a user can provide input for each of the two or more applications during the application session of the one application. The GUI generally includes a plurality of fields and/or selection buttons for receiving user inputs, and a plurality of text and/or image elements for providing information to the user. The fields, selection buttons, text, and images may be distributed across multiple pages of the GUI. In one example, a different page of the GUI is provided for obtaining input relating to each application. The GUI generally has a pre-determined look and feel, and is operative to maintain the same look and feel independent of which one of the applications a particular page relates to. The GUI thus has a similar visual appearance across all pages or elements of the GUI, and provides a similar user experience and response to user input across all pages or elements of the GUI.

In operation, as part of an application session of a primary application of the two or more applications installed on the mobile communication device, the primary application generates a GUI including a first interface for receiving input relating to the primary application from a user. The primary application additionally obtains user interface (UI) information from a secondary application of the two or more applications. The UI information is information for generating a second interface for receiving input relating to the secondary application from the user. The primary application processes the UI information from the secondary application to generate, based on the UI information, the second interface for receiving input relating to the secondary application. The primary application then incorporates the second interface within the GUI. During the application session of the primary application, the primary application displays the GUI including the first and second interfaces on the mobile communication device and receives user input relating to each of the primary and secondary applications through the mobile communication device. The primary application parses the received user input to identify user input relating to the secondary application, and communicates to the secondary application the identified user input relating to the secondary application.

The secondary application communicates the UI information to the primary application using a JavaScript Object Notation (JSON) or HyperText Transfer Protocol (HTTP)

schema for defining the structure and content of a user interface. The UI information can optionally additionally include a style sheet for defining visual elements of the interface generated based on the UI information.

In one example, the primary application is a setup wizard application of a manufacturer of the mobile communication device that is configured to generate a GUI for obtaining configuration settings for the mobile communication device from a user of the device. In this scenario, the secondary application may be a third-party application installed on the mobile communication device. The UI information communicated from the secondary application to the primary application may include UI information for generating a user interface for obtaining configuration settings and/or other setup information for the secondary application from a user of the mobile communication device. The methods and systems allow the user to provide configuration settings for both the mobile communication device and the third-party application through the GUI of the setup wizard during a single application session of the setup wizard. In this example, the GUI appears to the user as the setup wizard application, but may nonetheless be operative to obtain information relating to the third-party application from the user such that the third-party application can be configured for use by the user without the user being presented with a separate setup screen or separate setup prompts during a separate application session of the third-party application.

Reference now is made in detail to the examples illustrated in the accompanying drawings and discussed below.

Figure 1:
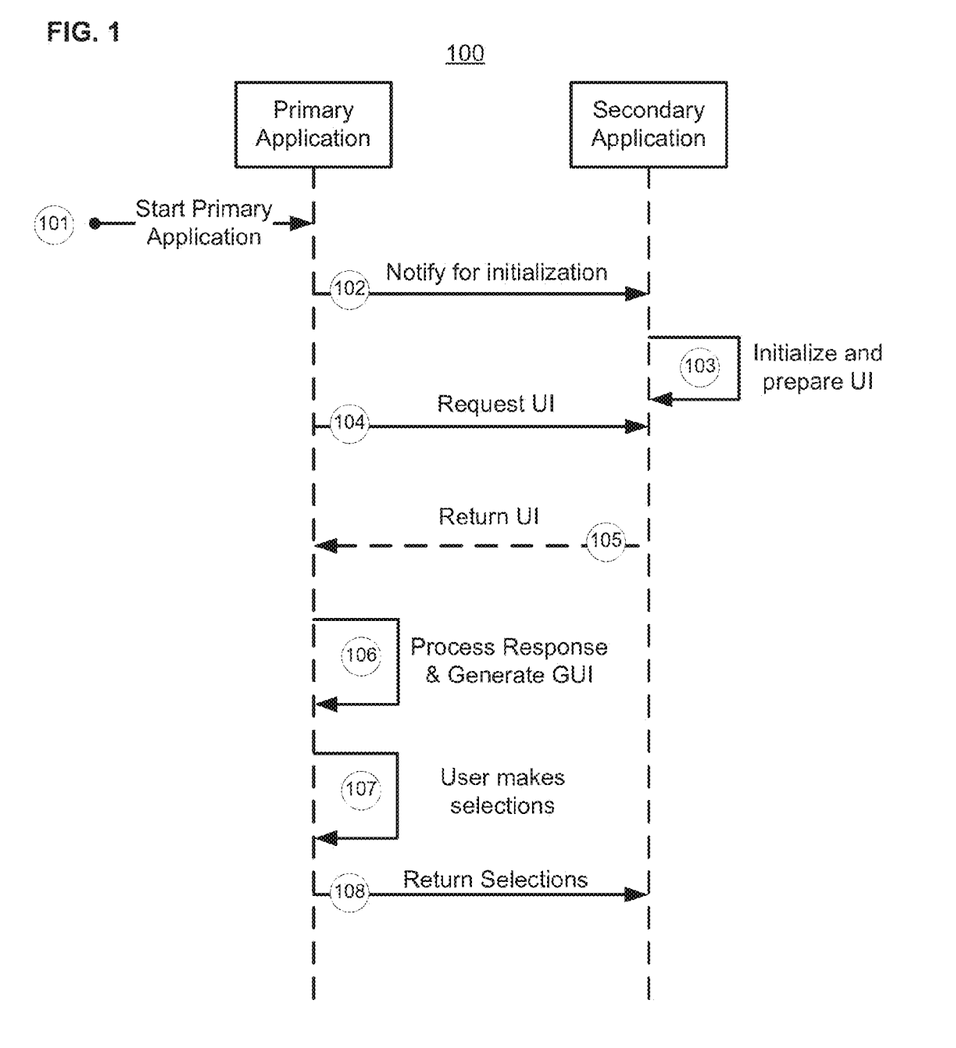
FIG. 1 is a flow diagram showing steps of a method for sharing of a graphical user interface of an application session of one application between two or more applications.

FIG. 1 is a flow diagram showing steps of a method 100 for sharing of a graphical user interface of an application session of one application between two or more applications. The method 100 includes two or more applications including a primary application and at least one secondary application. In the example shown FIG. 1, a single secondary application is shown; however, multiple secondary applications may more generally be involved.

The method 100 begins with step 101 in which the primary application begins execution on a mobile communication device. In one example, the primary application is a setup wizard of a manufacturer of the mobile communication device that begins execution automatically in response to the mobile communication device being first powered on (e.g., upon determining that the mobile communication device has not previously executed the setup wizard application, and/or requires setup information or setting of configuration parameters). More generally, however, the primary application can be any application installed on the mobile communication device and configured for execution by the mobile communication device.

As part of the execution of the primary application, an application session for the primary application is opened on the mobile communication device. The application session begins with the start of execution of the primary application, and persists until the execution of the primary application ends, for example in response to a request to close or exit the primary application. In general, the mobile communication device assigns and allocates resources to the application session when the primary application begins execution. The assigned resources are released when the primary application ends execution and exits and the application session closes. The assigned resources can include memory resources, such as storage in random access memory for storing parameters of the application.

During execution of the primary application, the primary application generates a graphical user interface (GUI) for display by the mobile communication device. The GUI generally includes information relating to the primary application, such as information for display to a user of the mobile communication device (e.g., text and/or images) and/or an input interface for obtaining information from the user of the mobile communication device (e.g., a text input field, selection buttons, or the like). Additionally, the GUI of the primary application may include information relating to applications other than the primary application, such as one or more secondary applications installed on the mobile communication device for execution by the device. In situations in which the GUI is configured to include information relating to applications other than the primary application, the primary application is configured to determine whether any of the other applications are installed on the device. In response to determining that at least one of the other applications is installed on the device, the primary application performs step 102 for each of the other applications installed on the device.

In step 102, the primary application generates and transmits a notification to the secondary application to cause the secondary application to initialize. The step can include the primary application causing the mobile communication device to begin execution of the secondary application, or of a sub-routine or other portion of the secondary application. In general, the secondary application begins execution in the background such that a user of the mobile communication device is not notified that the secondary application is executing. In one embodiment, execution of the secondary application is transparent to the user while the first application is running. The primary application typically continues execution in the foreground and maintains control of the mobile communication device's user input and output interfaces while the secondary application executes in the background. Step 102 may be repeated for each of the other applications from which the primary application is operative to obtain user interface information.

In general, in step 102, the primary application causes a sub-routine or other portion of the secondary application that is specially configured to execute in the background to be executed in step 102. As part of its background execution, the sub-routine or portion of the secondary application is configured to receive and parse the notification received from the primary application. The sub-routine or portion of the secondary application is further configured to specifically perform the functions described in relation to step 103 below. In some examples, the sub-routine or portion of the secondary application does not perform all functions provided by the secondary application, but is instead specifically configured to perform only those functions necessary to complete step 103. In other embodiments, the primary application causes the secondary application itself to begin execution in response to the notification of step 102. In such other embodiments, the notification transmitted by the primary application may cause an operating system of the mobile device to restrict operation of the secondary application during step 103 to background operation. In the other embodiments, the notification transmitted by the primary application may instruct the secondary application to execute in the background in step 103.

In response to the primary application causing the secondary application to initialize, the secondary application initializes in step 103. As part of the initialization, the secondary application aggregates user interface (UI) information for use in preparing a GUI for display to a user of the mobile communication device. The UI information is information used for generating a GUI. The UI information can include content to be displayed to a user, such as text or images to be included in the GUI for display to the user. The UI information can additionally include user input elements to be displayed to the user and/or used to receive input from the user, such as text input boxes, selection buttons, radio buttons, check boxes, or the like. The input elements included in the GUI can thus generate user input data by receiving and storing the input received from the user. The UI information can further include formatting information. The formatting information is used to determine how the content and user input elements are to be displayed, for example by determining a text font, a background color, or type of frame (e.g., dialog box, text box, or the like), by indicating where elements should be disposed relative to each other, and/or by defining other attributes of the UI. The UI information can further include audio features, including sounds for audio output and/or user input elements for receiving audio input from the user. The UI information can optionally include style sheets used to define the look and feel of a GUI.

The aggregation of the UI information can include retrieving information from memory of the mobile communication device, and/or requesting information (e.g., UI information, software updates, configuration information, or the like) from a remote server associated with the secondary application.

The aggregation can be based on information received from the primary application as part of step 102. For instance, the notification received by the secondary application from the primary application in step 102 can include one or more parameters relating to the GUI. In one embodiment, a language parameter indicative of the language to be used in the GUI is included in the notification. In the embodiment, the secondary application retrieves information based on the parameters in step 103, such as by requesting from a remote server associated with the secondary application content for generating a GUI in the language indicated by the parameter (e.g., to generate a Spanish-language display screen). In general, step 103 is repeated for each of the other applications to which the primary application has transmitted a notification in step 102.

Following the transmission of the notification of step 102, the primary application generates and transmits to the secondary application a request for UI information in step 104. Alternatively, in some embodiments, the request for UI information is transmitted substantially concurrently with the transmission of the notification of step 102. The request for UI information generally includes one or more parameters indicative of the UI information requested by the primary application. For example, a parameter can indicate that the requested UI information is for use in a device setup wizard, such that the secondary application can provide appropriate UI information according to the one or more parameters.

In response to receiving the request of step 104, the secondary application generates and transmits back to the primary application a return message including UI information in step 105. The UI information includes the UI information aggregated in steps 102 and 103 for use in preparing an interface (e.g., an interface screen) relating to the secondary application for display to a user of the mobile communication device. In general, the UI information is formatted according to a JSON or HTML schema for communicating the structure and content of a user interface. The UI information can optionally additionally include a style sheet for further defining visual elements of the interface generated based on the UI information.

In turn, in step 106, the primary application processes the received UI information to generate the GUI based on received UI information from the secondary application. The generating of the GUI including parsing of instructions formatted according to the JSON or HTML schema in the UI information of the secondary application. The generated GUI typically includes a first interface (e.g., an interface screen) for receiving input relating to the primary application from a user, and a second interface generated based on the received UI information and configured for receiving input relating to the secondary application from the user. Both the first interface and the second interface (and any further interfaces generated based on UI information received from other secondary applications) are incorporated within a same GUI to provide the user with a unified GUI for providing input to the primary and one or more secondary applications. Note that the first interface (for receiving input relating to the primary application) and the second interface (for receiving input relating to the secondary application) may appear on a same display screen of the unified GUI, for example such that a first text input field on the display screen relates to the primary application while a second text input field on the same display screen relates to the secondary application. The first and second interfaces may also appear on different display screens of the unified GUI, for example such that a first display screen includes the first interface while a second display screen different from the first display screen includes the second interface.

The primary application generally generates the first interface based on UI information of the primary application and on a style sheet of the primary application. The primary application further generates the second interface based on the UI information received from the secondary application. The second interface can be generated based on the style sheet of the primary application, such that the first and second interfaces have the same look and feel. The second interface can also be generated based on a style sheet received from the secondary application, if such a style sheet is received, such that the second interface has the same look and feel as other display screens of the secondary application. The second interface can alternatively be generated based on a combination of the style sheet of the primary application and the style sheet received from the secondary application, such that the second interface incorporates the look and feel of both the primary and secondary applications.

In step 107, the mobile communication device displays the generated GUI. In general, the GUI is shown on a display screen of the device, and includes at least an input interface for obtaining information relating to the secondary application from the user of the mobile communication device. The input interface is further commonly configured to obtain information relating to the primary application from the user. The generated GUI is displayed while the application session of the primary application is actively running in the foreground of the mobile communication device, such that the primary application and its application session control the user input and user output interfaces of the communication device while the GUI is displayed.

In response to the display of the GUI, the mobile communication device receives one or more user selections, submissions of information, or other types of user input which are stored in the memory of the communication device. In particular, the mobile communication device receives user input relating to the secondary application while operating in the application session of the primary application. The device can additionally receive user input relating to the primary application while operating in the application session of the primary application.

Finally, in step 108, the primary application processes the received user input in order to identify user input relating to the secondary application (or to each of the secondary applications, in examples in which there are two or more secondary applications). For each secondary application, the primary application transmits to the respective secondary application the received user input relating to the respective secondary application.

In some embodiments, the secondary application is executing in the background in during step 108. For example, the secondary application may have begun background execution in step 103 and provided the UI information in step 105, and may remain executing in the background during step 108. In such embodiments, the secondary application receives the relevant user input from the primary application and processes the received user input in order to configure the secondary application based on the received user input. The secondary application may additionally or alternatively store the received user input information in a predetermined storage location such that the received user input information can be retrieved from the predetermined storage location by the secondary application during future execution of the secondary application.

In other embodiments, the secondary application may no longer be executing during step 108. For example, the secondary application may have automatically ceased background execution following completion of step 105. In such embodiments, the primary application may transmit the received user input to the secondary application by storing the received user input in the predetermined storage location in memory that is associated with the secondary application. During the next execution of the secondary application, the secondary application may access the predetermined storage location to determine whether user input information (and/or other configuration information obtained from a user by the primary application) is stored in the predetermined location. In response to determining that user input information is stored in the storage location, the secondary application retrieves the information from the predetermined location and processes the information in order to configure the application.

Figure 2A:
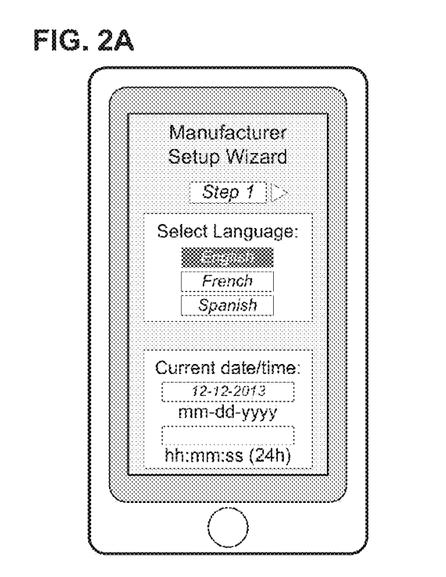
FIGS. 2A-2D are illustrative screen shots of a mobile communication device sharing of a graphical user interface of an application session of one application between two or more applications.
Figure 2B:
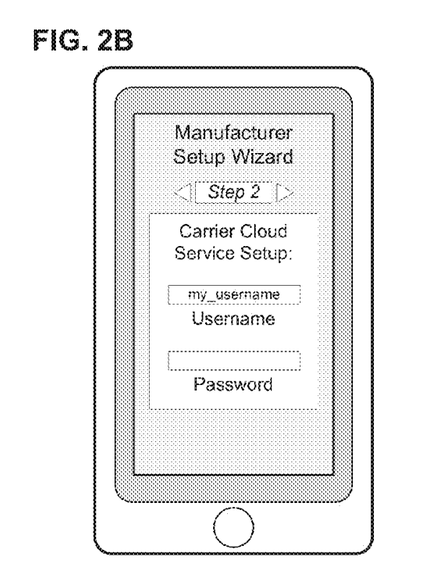
Figure 2C:
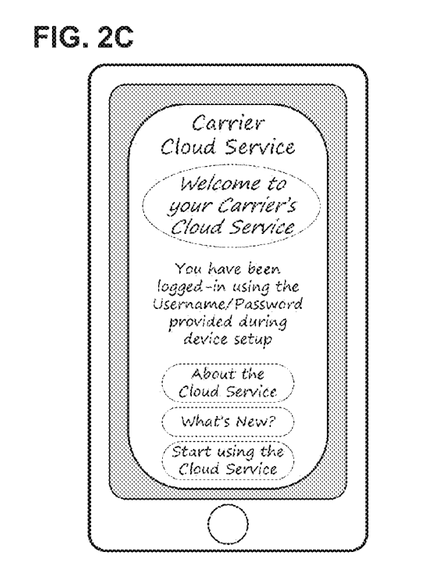
Figure 2D:
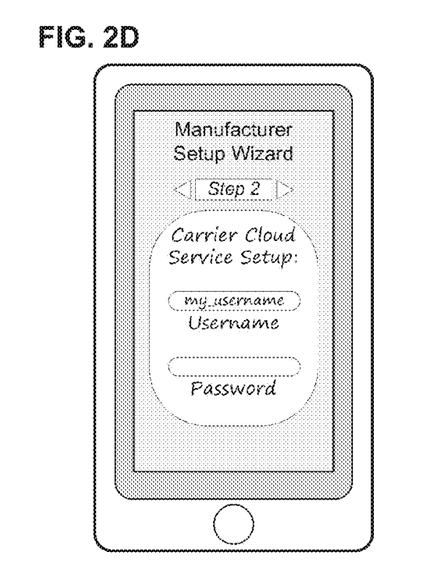

FIGS. 2A-2D are illustrative screen shots taken from a mobile communication device sharing of a graphical user interface of an application session of one application between two or more applications. FIGS. 2A, 2B, and 2D are screen shots taken when an application session for a manufacturer setup wizard functioning as a primary application is running in the foreground of the device, while FIG. 2C is a screen shot taken when a carrier cloud service functioning as a secondary application is running in the foreground.

FIG. 2A shows a first setup screen displayed on a mobile communication device by a manufacturer setup wizard running on the device. The manufacturer setup wizard functions as a primary application on the device. The first setup screen is generated by the manufacturer setup wizard application for display on the mobile communication device, and includes content relating to the manufacturer setup wizard application and input interface elements for obtaining from a user information relating to the manufacturer setup wizard application. In the example shown, the first setup screen includes input interface elements for obtaining a language selection from the user, and for enabling the user to enter a current date and time for use by the manufacturer setup wizard.

In response to receiving a user selection of a language in the first setup screen, the setup wizard application may communicate to a secondary application, such as a carrier cloud service setup application, a request for UI information. The request may include identification of the user's selected language. In turn, the manufacturer setup wizard application receives the UI information from the carrier cloud service setup application, and generates a second setup screen shown in FIG. 2B.

FIG. 2B shows the second setup screen displayed on a mobile communication device by a manufacturer setup wizard running on the device. The second setup screen is generated by the manufacturer setup wizard application based on the UI information received from the carrier cloud service setup application. The second setup screen thus includes content relating to the carrier cloud service setup application, and input interface elements for obtaining from a user information relating to the carrier cloud service setup application. In the example shown, the second setup screen includes input interface elements for obtaining a username and password for accessing the carrier cloud service. The carrier cloud service application functions as a secondary application with respect to the manufacturer setup wizard application.

As shown in FIGS. 2A and 2B, the first and second setup screens have a similar look and feel. For example, the text font and text-box styling are the same in both setup screens. Furthermore, both the first and second setup screens are generated by the same application (i.e., the manufacturer setup wizard application), are displayed in an application session of the same application, and received user input is provided to the manufacturer setup wizard for processing.

FIG. 2C shows a screen shot taken following the first activation by a user of the carrier cloud service application on the mobile communication device. The carrier cloud service application functions as a secondary application with respect to the manufacturer setup wizard. As a result, as part of an earlier application session of the manufacturer setup wizard, the application setup wizard has obtained configuration information from the user for the carrier cloud service application. In this case, the configuration information includes the username and password for the cloud service obtained from the user in FIG. 2B.

The carrier cloud service application is a standalone application installed on the mobile communication device. When the carrier cloud service application is executed on the mobile device, an application session for the carrier cloud service application is opened on the device. The application session for the cloud service application is separate and distinct from any application session for the manufacturer setup wizard, and does not require that the manufacturer setup wizard be executed concurrently on the device (or that the manufacturer setup wizard have an application session concurrently on the device).

As shown in FIG. 2C, upon first activating the carrier cloud service application, the carrier cloud service application may generate and display the welcome screen shown in the figure. In particular, the carrier cloud service application does not need to present an application setup screen or otherwise prompt the user for configuration settings because such configuration settings have been received from the manufacturer setup wizard. In the present example, the carrier cloud service application has therefore automatically logged the user in to the cloud service using the username and password provided by the user through the manufacturer setup wizard, and returned by the manufacturer setup wizard to the cloud service application.

The welcome screen is generated by the carrier cloud service application for display on the mobile communication device. In general, the carrier cloud service application can have a look and feel that is different from that of the manufacturer setup wizard, as shown in FIGS. 2B and 2C by the use of different text fonts and text box styling (e.g., rounded corners). The carrier cloud service application has a look and feel that can be different from any display screen of the manufacturer setup wizard, including any display screen of the manufacturer setup wizard that related to the carrier cloud service application (e.g., the display screen of FIG. 2B).

While the illustrative first and second setup screens shown in FIGS. 2A and 2B have a similar look and feel that is consistent with the look and feel of the primary application (i.e., the manufacturer setup wizard), in other embodiments different setup screens forming part of a GUI and/or different elements within a setup screen or page can have a different look and feel from each other. For example, FIG. 2D illustratively shows the second setup screen of FIG. 2B in which at least some of the elements are displayed with a look and feel that is consistent with the look and feel of the secondary application. In the example of FIG. 2D, the elements relating to the "Carrier Cloud Service Setup" are displayed on the setup screen with a look and feel consistent with the carrier cloud service application (e.g., text fonts and text box styling consistent with the look and feel of the display screen of FIG. 2C), while other elements are displayed with a look and feel consistent with the manufacturer setup wizard (e.g., text fonts and text box styling consistent with the look and feel of the display screen of FIG. 2A). In other examples, all of the elements of the first setup screen may have a first look and feel (e.g., as shown in FIG. 2A), while all elements of the second setup screen that forms part of the same GUI may have a second look and feel different from the first look and feel. Information on the different look and feel can be communicated to the primary application from the secondary application as UI information in step 105, for example as part of a style sheet associated with the secondary application.

Figure 3A:
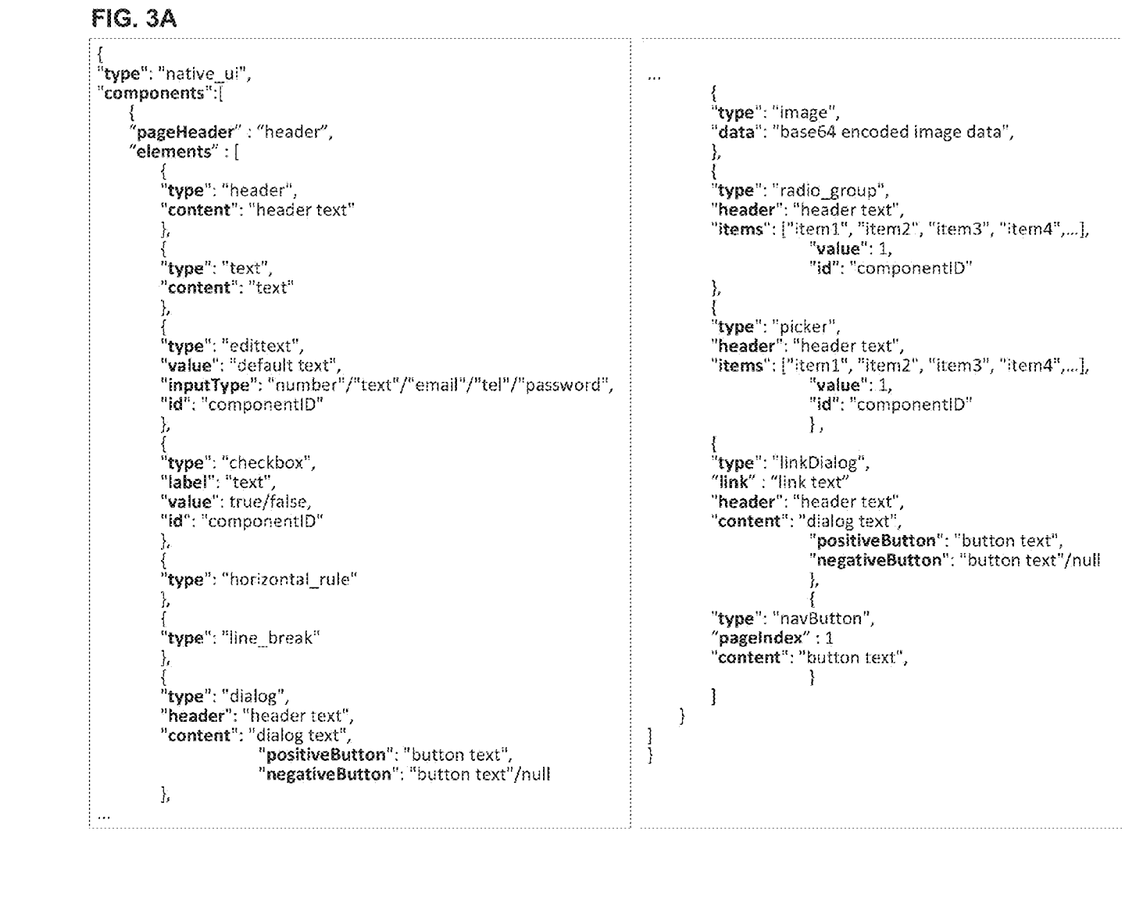
FIG. 3A shows an illustrative JavaScript Object Notation (JSON) schema for communicating user interface (UI) information between a secondary application and a primary application.
Figure 3B:
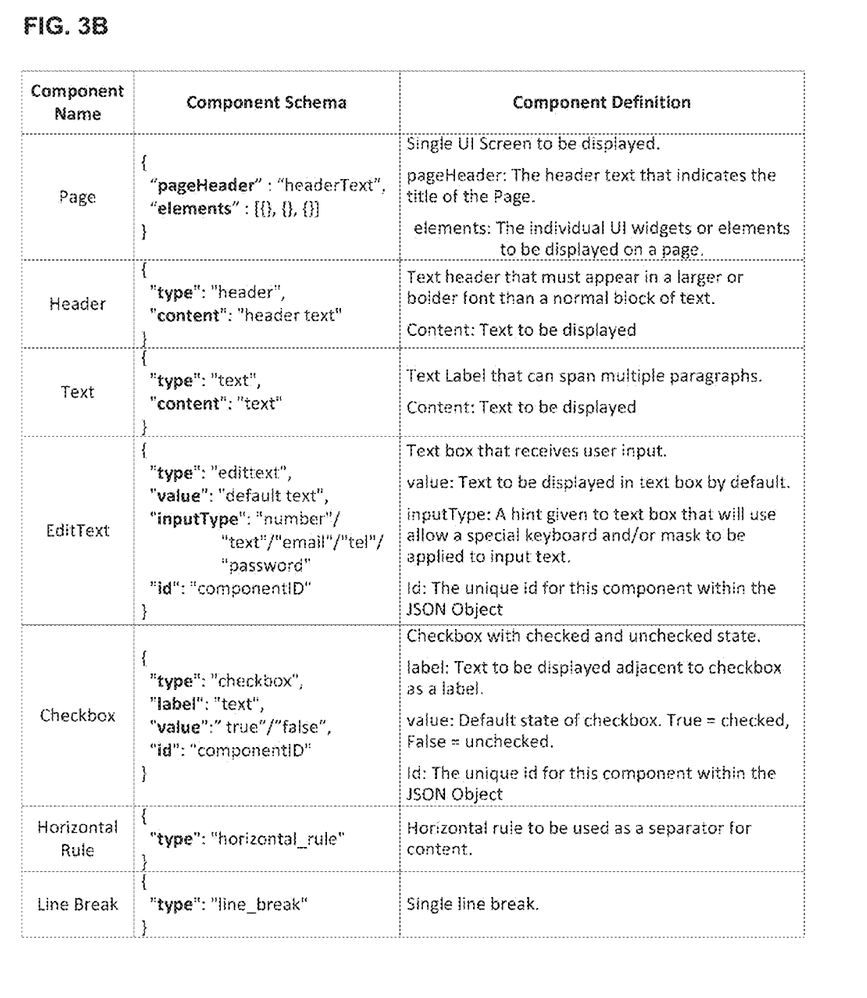
Figure 3D:
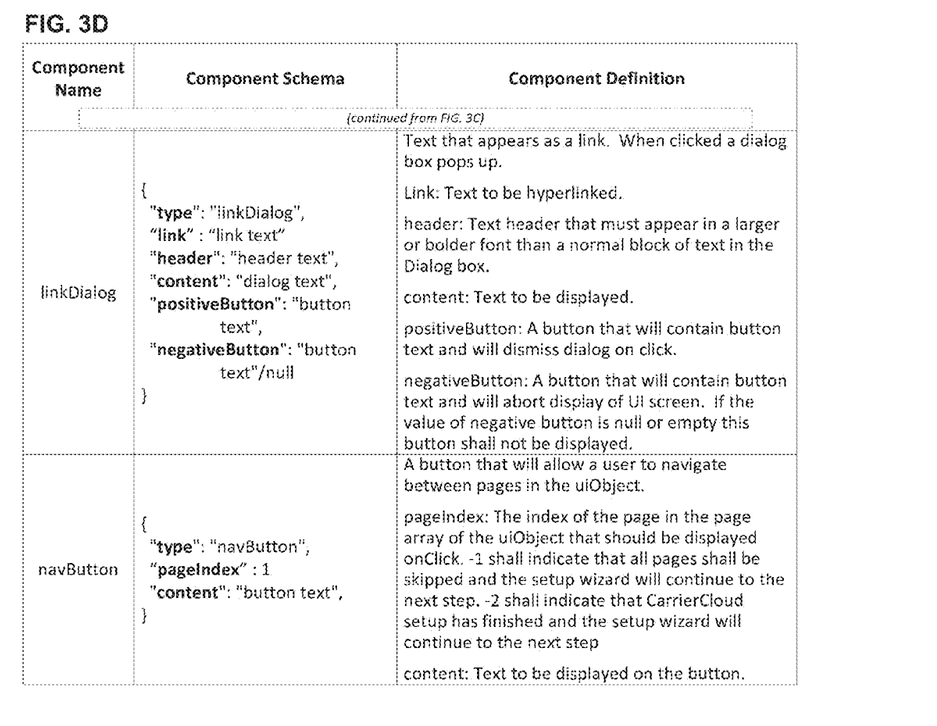

FIG. 3A shows an illustrative JSON schema for communicating UI information between a secondary application and a primary application, and FIGS. 3B-3D show a table including the component definitions for UI objects used in the JSON schema of FIG. 3A. The JSON schema shown in FIGS. 3A-3D is provided for illustrative purposes, and other modes of communicating UI information can more generally be used in accordance with the inventive concepts presented herein.

As shown, the JSON schema enables a secondary application to provide UI information to a primary application including text information to be displayed within the header and/or body of a display page. The JSON schema further enables information on text-input and other user input interface elements, such as text boxes, check boxes, selection buttons, radio buttons, selection pickers, and the like, to be communicated from the secondary application to the primary application. The user input interface elements include text information to be displayed, information on the type or format of input expected from the user, and an identifier for uniquely identifying content received from the user and associated with each user input element. The unique identifier, which can take the form of a randomly assigned number, is used by the primary application to identify a particular item of user input information (e.g., an item including user input entered into a "User Name" text input field element of the user input interface) among all user input information received through the user input interface for the secondary application (e.g., among user input entered into "Password", "Address", and other text input field elements of the user input interface). The UI information can further include display and formatting information, including information for determining how various elements should be disposed relative to each other within a graphical user interface. The UI information encoded by secondary applications in accordance with the JSON schema is parsed by the primary application and used by the primary application to generate the GUI interface.

Figure 4:
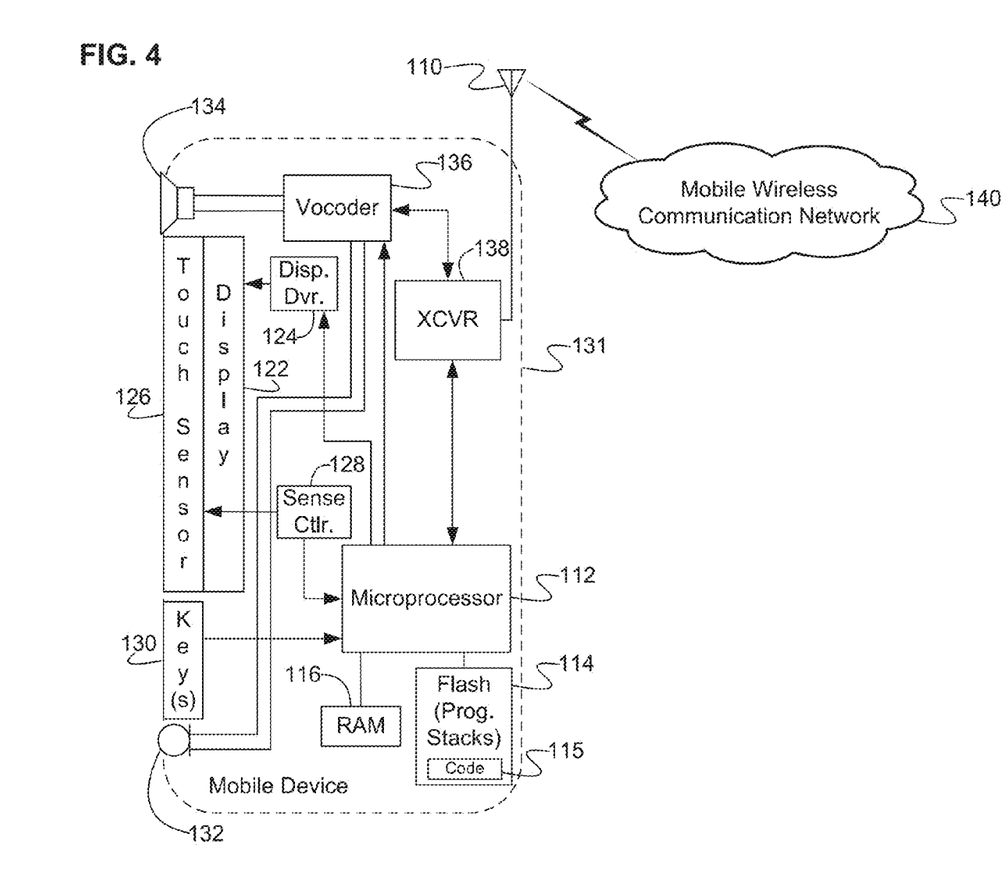
FIG. 4 is a high-level functional block diagram of a mobile communication device as may implement the method illustratively shown in FIG. 1.

FIG. 4 provides a block diagram illustration of an exemplary touch screen type mobile communication device 131. Although the mobile communication device 131 may be a smart-phone or may be incorporated into another device, such as a personal digital assistant (PDA) or the like, for discussion purposes, the illustration shows the communication device 131 in the form of a handset. The handset embodiment of the communication device 131 functions as a normal digital wireless telephone station. For that function, the device 131 includes a microphone 132 for audio signal input, a speaker 134 for audio signal output, and voice coding and decoding circuitry (vocoder) 136.

Mobile communication devices 131 can execute various program applications, including primary and secondary applications involved in the sharing of a graphical user interface of an application session of one application between two or more applications. For example, a mobile device application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

For digital wireless communications, the device 131 also includes at least one digital transceiver (XCVR) 138. Today, the device 131 would be configured for digital wireless communications using one or more of the common network technology types through communication networks such as mobile communication network 140. The concepts discussed here encompass embodiments of the mobile communication device 131 utilizing any digital transceivers that conform to current or future developed digital wireless communication standards. The communication device 131 may also be capable of analog operation via a legacy network technology.

The transceiver 138 provides two-way wireless communication of information, such as vocoded speech samples and/or digital information, in accordance with the technology of the network 140. The transceiver 138 also sends and receives a variety of signaling messages in support of the various voice and data services provided via the mobile communication device 131 and the communication network. Each transceiver 138 connects through RF send and receive amplifiers (not separately shown) to an antenna 110. The transceiver may also support various types of mobile messaging services, such as short message service (SMS), enhanced messaging service (EMS) and/or multimedia messaging service (MMS). The mobile communication device 131 may include an additional digital or analog transceiver.

A microprocessor 112 serves as a programmable controller for the device 131, in that it controls all operations of the device 131 in accord with programming that it executes, for all normal operations, and for operations involved in the sharing of a graphical user interface of an application session of one application between two or more applications. In the example, the mobile communication device 131 includes flash type program memory 114, for storage of various program routines and mobile configuration settings. The mobile communication device 131 may also include a non-volatile random access memory (RAM) 116 for a working data processing memory. Of course, other storage devices or configurations may be added to or substituted for those in the example. The mobile communication device 131 includes a processor, and programming stored in the flash memory 114 configures the processor so that the mobile station is capable of performing various desired functions, including in this case program code 115 for configuring the processor to perform the functions involved in executing primary and secondary applications and in sharing of a graphical user interface of an application session of one application between two or more applications. The code 115 may more generally be stored in a non-transitory machine-readable storage medium.

The mobile communication device 131 includes a display, a keypad, and a touch-screen input interface serving as a user interface. The device 131 may have a limited number of key 130, and the majority of user interface functions can be performed using a touchscreen display arrangement. At a high level, a touchscreen display is a device that displays information to a user and can detect occurrence and location of a touch on the area of the display. The touch may be an actual touch of the display device with a finger, stylus, or other object, although at least some touchscreens can also sense when the object is in close proximity to the screen. Use of a touchscreen display as part of the user interface enables a user to interact directly with the information presented on the display.

Hence, the device 131 includes a display 122, which the microprocessor 112 controls via a display driver 124, to present visible outputs to the device user. The device 131 also includes a touch/position sensor 126. The sensor 126 is relatively transparent, so that the user may view the information presented on the display 122. A sense circuit 128 senses signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen. Various combinations of the keypad 130, display 122, touch/position sensor 126, microphone 132, and speaker 134 may be used as the physical input output elements of the graphical user interface (GUI), for multimedia (e.g., audio and/or video) communications. Of course other user interface elements may be used, such as a trackball, as in some types of PDAs or smart phones.

In various embodiments, the mobile wireless mobile communication network 140 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile communication device 131 may be capable of voice telephone and data communications through the particular type of network 140.

The network 140 allows users of the mobile communication devices such as 131 (and other mobile stations not shown) to initiate and receive telephone calls. The network 140 typically offers a variety of data services via the Internet, such as downloads, web browsing, email, etc. In order to provide such data services for the mobile devices 131, the network 140 is connected to the Internet via one or more gateway, such that the mobile devices 131 can communication via the gateways with servers and/or computers connected for communication through the Internet. The mobile devices 131 also can receive and execute applications written in various programming languages.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
opening, by a setup application configured to begin execution automatically in response to a mobile communication device being first powered on by a user to obtain settings from the user for configuring the mobile communication device for operation, an application session of the setup application on the mobile communication device in response to a determination that the setup application has not previously executed on the mobile communication device;
generating and transmitting, by the setup application, a request for an end-user application installed on the mobile communication device along with the setup application to provide user interface (UI) information to be used by the setup application to generate a user interface by which the setup application will obtain configuration settings including setup information for the end-user application from the user;
receiving, by the setup application from the end-user application based on the request, the UI information to be used by the setup application to generate the user interface by which the setup application will obtain the configuration settings including the setup information for the end-user application from the user;
generating, by the setup application based on the received UI information from the end-user application, a graphical user interface (GUI) including the user interface by which the setup application will obtain the configuration settings including the setup information for the end-user application from the user;
displaying, by the setup application and within the application session of the setup application opened on the mobile communication device, the generated GUI including the user interface;
obtaining, by the setup application from the user and within the application session of the setup application, user input representative of the configuration settings including the setup information for the end-user application; and
transmitting, by the setup application to the end-user application, the obtained user input representative of the configuration settings including the setup information for the end-user application, the transmitting of the obtained user input including storing the obtained user input in a predetermined storage location in memory that is associated with the end-user application to allow the end-user application to access the obtained user input at the predetermined storage location during a next execution of the end-user application.

2. The method of claim 1, further comprising:
prior to transmitting the request for UI information from the setup application, generating and transmitting, by the setup application to the end-user application, a notification to cause the end-user application to begin execution in the background while the setup application is running.

3. The method of claim 1, wherein the generating the GUI comprises generating, by the setup application, a GUI including the user interface by which the setup application will obtain the configuration settings including the setup information for the end-user application from the user and an interface for receiving input relating to the setup application from the user.

4. The method of claim 3, wherein the setup application generates the user interface by which the setup application will obtain the configuration settings including the setup information for the end-user application and the interface for receiving input relating to the setup application to have a similar visual appearance and user experience.

5. The method of claim 3, wherein the setup application generates the user interface by which the setup application will obtain the configuration settings including the setup information for the end-user application to have a visual appearance and user experience consistent with a look and feel of the end-user application.

6. The method of claim 3, further comprising:
in response to receiving user input relating to the generated GUI from the user, processing the received user input relating to the generated GUI to identify the user input representative of the configuration settings including the setup information for the end-user application;
wherein the transmitting of the obtained user input representative of the configuration settings including the setup information for the end-user application is performed in response to the identification of the user input and includes transmitting the received user input identified as the user input representative of the configuration settings including the setup information for the end-user application.

7. The method of claim 1,
wherein the UI information identifies at least one user input element to be displayed to the user so as to receive from the user a text or selection input, and the identified at least one user input element includes a unique identifier for identifying content received from the user through the user input element.

8. The method of claim 1,
wherein the UI information received from the end-user application is formatted in accordance with a JavaScript Object Notation (JSON) or HyperText Transfer Protocol (HTTP) schema for defining the structure and content of a user interface.

9. The method of claim 8, wherein the UI information received from the end-user application further comprises a style sheet for defining visual elements of the GUI generated based on the UI information.

10. The method of claim 1, wherein:
the end-user application automatically ceases background execution on the mobile communication device prior to the transmitting of the obtained user input representative of the configuration settings including setup information for the end-user application.

11. A mobile communication device comprising:
a display screen configured to display information to a user of the mobile communication device;
a user input interface configured to receive input from the user of the mobile communication device;
a memory; and
a processor operative to execute machine-readable instructions stored in the memory to cause the mobile communication device to perform functions including functions to:

open an application session of a setup application on the mobile communication device in response to a determination that the setup application has not previously executed on the mobile communication device, the setup application configured to begin execution automatically in response to the mobile communication device being first powered on by the user to obtain settings from the user for configuring the mobile communication device for operation;

generate and transmit, from the setup application to an end-user application installed on the mobile communication device along with the setup application, a request for the end-user application to provide user interface (UI) information to be used by the setup application to generate a user interface by which the setup application will obtain configuration settings including setup information for the end-user application from the user;

receive, by the setup application from the end-user application based on the request, the UI information to be used by the setup application to generate the user interface by which the setup application will obtain the configuration settings including setup information for the end-user application from the user;

generate, in the setup application based on the received UI information from the end-user application, a graphical user interface (GUI) including the user interface by which the setup application will obtain the configuration settings including setup information for the end-user application from the user;

display the generated GUI including the user interface on the display screen of the mobile communication device within the application session of the setup application;

obtain, from the user and within the application session of the setup application, user input representative of the configuration settings including setup information for the end-user application; and transmit, from the setup application to the end-user application, the obtained user input representative of the configuration settings including setup information for the end-user application, the transmission of the obtained user input including storing the obtained user input in a predetermined storage location in the memory that is associated with the end-user application to allow the end-user application to access the obtained user input at the predetermined storage location during a next execution of the end-user application.

12. The mobile communication device of claim 11, wherein the processor causes the mobile communication device to perform a further function to:

prior to transmitting the request for UI information from the setup application, generate and transmit from the setup application to the end-user application a notification to cause the end-user application to begin execution in the background.

13. The mobile communication device of claim 11, wherein the function to generate the GUI comprises a function to generate, in the setup application, a GUI including the user interface by which the setup application will obtain the configuration settings including setup information for the end-user application from the user and an interface for receiving input relating to the setup application from the user.

14. The mobile communication device of claim 13, wherein the setup application generates the user interface by which the setup application will obtain the configuration settings including setup information for the end-user application and the interface for receiving input relating to the setup application to have a same or similar visual appearance and user experience.

15. The mobile communication device of claim 13, wherein the setup application generates the user interface by which the setup application will obtain the configuration settings including setup information for the end-user application to have a visual appearance and user experience consistent with a look-and-feel of the end-user application.

16. The mobile communication device of claim 13, wherein the processor causes the mobile communication device to perform a further function to:

in response to receiving user input relating to the generated GUI from the user, process the received user input relating to the generated GUI to identify the user input representative of the configuration settings including setup information for the end-user application;

wherein the function to transmit the obtained user input representative of the configuration settings including the setup information for the end-user application is performed in response to the identification of the user input and includes transmitting the received user input identified as the user input representative of the configuration settings including setup information for the end-user application.

17. The mobile communication device of claim 11, wherein the UI information identifies at least one user input element to be displayed to the user so as to receive from the user a text or selection input, and the identified at least one user input element includes a unique identifier for identifying content received from the user through the user input element.

18. The mobile communication device of claim 11, wherein the UI information received from the end-user application is formatted in accordance with a JavaScript Object Notation (JSON) or HyperText Transfer Protocol (HTTP) schema for defining the structure and content of a user interface.

19. The mobile communication device of claim 18, wherein the UI information received from the end-user application further comprises a style sheet for defining visual elements of the GUI generated based on the UI information.

20. The mobile communication device of claim 11, wherein:

the end-user application automatically ceases background execution on the mobile communication device prior to the mobile communication device performing the function to transmit the obtained user input representative of the configuration settings including setup information for the end-user application.

\* \* \* \* \*